Sept. 1, 1953            H. G. CROUCHER            2,650,697
MEANS FOR CONTROLLING CHARACTER WIDTH OR SPACING
IN APPARATUS FOR COMPOSING OR REPRODUCING
TYPOGRAPHICAL AND LIKE MATTER

Filed June 8, 1951            6 Sheets-Sheet 1

Inventor
Henry G Croucher
By Hall & Houghton
attorneys

Sept. 1, 1953 H. G. CROUCHER 2,650,697
MEANS FOR CONTROLLING CHARACTER WIDTH OR SPACING
IN APPARATUS FOR COMPOSING OR REPRODUCING
TYPOGRAPHICAL AND LIKE MATTER
Filed June 8, 1951 6 Sheets-Sheet 3

Inventor
Henry G. Croucher
By Hall & Houghton
attorneys

Fig. 22.

Patented Sept. 1, 1953

2,650,697

UNITED STATES PATENT OFFICE 2,650,697

MEANS FOR CONTROLLING CHARACTER WIDTH OR SPACING IN APPARATUS FOR COMPOSING OR REPRODUCING TYPOGRAPHICAL AND LIKE MATTER

Henry George Croucher, Beccles, England, assignor to William Clowes & Sons Limited, Beccles, England Application June 8, 1951, Serial No. 230,642
In Great Britain June 13, 1950

31 Claims. (Cl. 199—80)

This invention relates to apparatus for composing or reproducing typographical and like matter of the kind in which the character width or spacing is controlled by a displaceable member of wedge or like form which is interposed in the path of a movable member to limit the periodic travel thereof to variable amounts according to the position of the wedge or like member, the travel of the movable member being utilised to control the width or spacing of the character, which latter may be cast in the form of type or otherwise reproduced. Such control is employed for example in single-type composing machine as described in British patent specification No. 8,633 of 1899 for determining the width of the cast type and may also be applied in conjunction with apparatus as described in the specification of British patent application No. 6,848 of 1949 (U. S. application Ser. No. 145,132, filed March 7, 1950, patented March 19, 1953, No. 2,639,067) for controlling the spacing of the characters, such characters being capable of reproduction by any desired means, including photographic means if desired.

In single-type composing machines known under the registered trade-mark Monotype, the sizing of spaces and characters is controlled with the aid of a so-called normal wedge which regulates the opening of the mould blade in measurements of units, such units corresponding to the unit widths of the matrices in the matrix case by which the type faces are cast in the mould.

Such an arrangement involves the use of a different wedge device for each set size width of series of type faces. Furthermore, different kinds of type faces require different unit arrangements so that the number of different wedge devices required for the usual range of type sizes in a variety of type faces becomes very large.

It is an object of this invention to provide an improved controlling wedge or like member for the purpose described which does not require to be exchanged for different set width sizes for the same unit arrangement. A further object is to provide an improved controlling wedge or like member for affording a series of unit measurements which does not require to be exchanged when it is desired to employ different arrangements of unit measurements. A further object is to provide a sizing means or arrangement of the kind described which can be varied by automatic or mechanical means.

The invention comprises a control device of the kind described including pivotally or oscillatably mounted means affording limit controlling faces constituting a unit or like series, and means for controllably varying the inclination of said mounted means with respect to a datum for obtaining desired variation in set sizes.

The invention also comprises a device according to the preceding paragraph in which the inclinations of the mounted means with respect to the datum are uniformly varied at each adjustment so that the controlling faces remain parallel and the unit arrangement is maintained throughout the range of adjustment.

The invention also comprises a device according to either of the preceding two paragraphs in which the controlling means for varying the inclinations of the mounted means is or are arranged so that successive increases in inclination with respect to the aforesaid datum are progressively reduced so that the adjusted displacements of the controlling faces in a direction transverse to the datum comprise uniform increments throughout the range of adjustment.

According to a further feature of the invention, the mounted means comprise elongated members or bars having their pivots or fulcrums spaced apart along a line which is preferably the aforesaid datum line, the bars being of equal length and their ends being equally displaceable transversely to the said datum, and the spacing of the pivots or fulcrums is such that the desired variation in set sizes can be obtained with the same unit arrangement.

In a convenient arrangement according to the invention, the limit controlling faces on the members or bars correspond to the matrix or die case rows in apparatus as described in the British patent specifications previously referred to, and the controlling faces are distributed among a suitable number of mounted members or bars according to the unit arrangement employed. A sufficient number of mounted members or bars is provided to afford the required unit arrangement for a number of different type faces, but all of the said members need not be used for each type face. It is a feature of the invention that the constant displacements of the controlling faces by adjustment of the bars or equivalent means enables different bars to afford the same unit widths for different die case rows as for example where provision must be made for two or three rows of the same unit width.

The invention also comprises a control device of the kind described including pivotally or oscillatably mounted means adapted to carry limit controlling faces, means for controllably varying the inclination of said means with respect to a datum for obtaining desired variations in set size, and means for adjusting or varying the limit controlling faces on said means for obtaining different unit arrangements of said faces.

In a convenient arrangement according to the preceding paragraph, the mounted means comprise elongated members or bars having suitably spaced pivots or fulcrums, and the limit controlling faces comprise studs or equivalent members which can be inserted or adjusted to different positions along the bars, the provided or adjusted positions of said members affording the desired different unit arrangement or unit series of limit controlling or striking faces. Thus in one mode of construction, a grid or perforated plate is located adjacent the bars and has rows of spaced perforations corresponding vertically to the bars, and horizontally to the mould blade abutment striking positions. Studs or the like are inserted at the required positions in the rows to engage the bars and afford the desired unit arrangement of striking faces.

Any convenient means may be provided for adjusting the inclination of the mounted means according to the invention. In a preferred arrangement such adjusting means comprises a longitudinally displaceable wedge or wedges. Such adjusting wedge can engage the bars directly, i. e. it can be incorporated in the control wedge device itself and can be provided with suitable adjusting means, or it can be disposed outside the device and the adjusting movements can be transmitted to the bars or their equivalent by suitable mechanical means, preferably including a slidable wedge form member which is engaged by the bars or the like. The variation in inclination of the bars or equivalent means may be effected either by displacing the free ends of said means or by displacing the pivots or fulcrums, or by a combination of both displacements.

According to a further feature of the invention, means is provided for mechanically or automatically effecting the desired variations in set size of the control device, such variation being capable of being controlled from a keyboard or like mechanism and the variation being predetermined by manual setting of means which determines the positioning of the adjusting wedge.

The invention is intended more particularly for application to single type composing machines wherein a die case or holder carries rows of matrices, dies or other elements capable of reproducing type faced and like characters and is suitably positioned for reproduction of the selected character. Such reproduction may be effected by casting as in the machine known under the registered trade-mark Monotype, by impression or the like as in the British patent application referred to previously, or by other means such as photography. In such machines or apparatus the character width or spacing is determined by the motion of the known mould blade abutment or its equivalent and the controlling device or wedge-like member is preferably interposed between such movable abutment and the known transfer wedges, the position of the device in question determining the periodic travel of the abutment. The controlling device could be inserted between the space transfer wedge and the justification wedges, or between the type transfer wedge and its abutment. It is to be understood that the invention is not restricted to such arrangements, but can be employed in conjunction with any apparatus for producing lines of characters in which character width or spacing is controlled by a variable stop of wedge like or similar form.

An important advantage obtained by this invention is that the set size of the control means or wedge device is not fixed in relation to the die case or equivalent row. Thus for example a character of any width can be in any desired row, this being dependent on the arrangement of the pivots or fulcrums of the mounted means or bars. Also the size of any one character can be increased or decreased as desired by suitable variation of the controlling means as described.

In the accompanying drawings.

The invention will be described as applied by way of example to a control member or wedge for the known machine referred to previously, having a die case of fifteen rows, the characters of the different rows having various widths measured in units which are multiples of .0007685″. Usually the characters of the first row have a width of five units and those of the fifteenth row have a width of eighteen units, the intermediate rows being variously arranged according to the character of the type face. The known normal wedge has a plane face and an opposite face which is stepped in units corresponding to the widths required for the die case rows, the wedge being longitudinally displaceable and adapted to be interposed between the mould blade abutment and either the space transfer wedge or the type transfer wedge as is well understood. According to the invention, a plurality of pivoted means such as bars are provided, the pivots being disposed in a straight line at predetermined distances apart. If the base or datum is divided into steps of .2" in length, such step length being the width of the matrix or other character forming element, then a straight line drawn through the first pivot point can be inclined to the base line or datum so that its distances therefrom at each step are increased by the amount of the basic unit, i. e. .0007685". Thus a bar or other means pivoted as described can be arranged to give the above measurements at right angles to the base line at the different steps. Similar bars or other means having their pivots disposed suitably at other steps will afford the same increments between steps but the actual dimension at right angles to the base line will be different at corresponding steps owing to the different positions of the pivots. Such means or bars can be provided in a wedge-like member similar to the known wedge and can be arranged to provide the required set widths for the different die case rows. By increasing the inclinations of the means or bars to the base line by the required equal amounts for each means or bar, the dimensions afforded at right angles to the base line can be increased by units as desired at the different steps corresponding to the die case rows. By maintaining the parallel relation of the said means or bars, a factor of unit multiplication is afforded, so that for example an adjacent bar can be used to obtain the same unit width as another bar but at a different die case row. The foregoing illustrates the principle upon which the invention is based.

Figure 1:
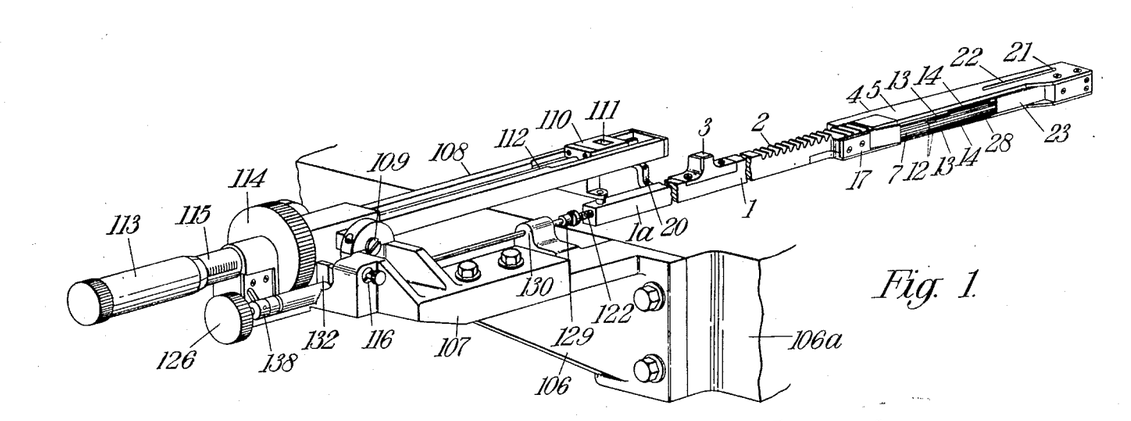
Figure 1 is a perspective view of a control device constructed in accordance with the invention including manual adjusting gear.
Figure 2:
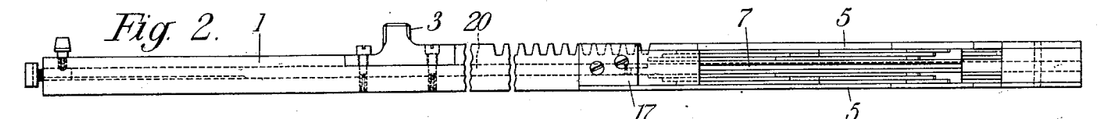
Figure 2 is a side elevation of the device.
Figure 3:
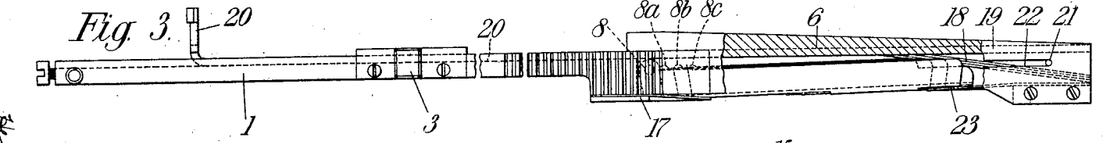
Figure 3 is a plan view of the device, partly in section.
Figure 4:
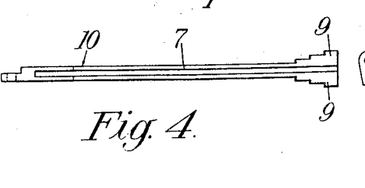
Figure 4 is a plan view of the first blade element of the device.
Figure 5:
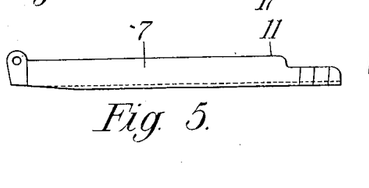
Figure 5 is an elevation of the first blade element.
Figure 6:
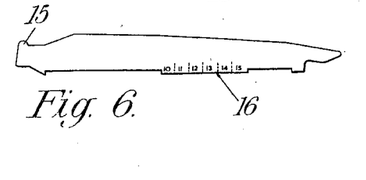
Figure 6 is an elevation of the fourth blade element of the device.

In carrying the invention into effect according to one convenient form, a wedge device will be considered suitable for a modern book face S.5 unit arrangement provided with unit positions 5 to 18. Referring to Figures 1, 2 and 3, the wedge has the usual shank or extension 1, a positioning rack 2, and a lug 3 for setting by the matrix jaws of the known machine or such as described in British patent specification No. 8,633 of 1899. The wedge has a plane face 4 and the opposite side is hollow and is constituted by side plates 5 which are integral with the cover plate 6. Four sets of bars, or blade elements, each set comprising two bars, are located between the cover plates 5. The two inner bars 7 are integral and are pivoted at one end upon a stud 8. The opposite end of this multiple blade bar carries shaped projections 9 which support the outer ends of the other bars. The bars 7 are formed with unit faces 5, 6, 7, 8 and 9, the positions of which are indicated generally at 10 in Figure 4. This bar will be called for convenience the first bar, and has a cam face 11 which is 3.6" away from its pivot on the side opposite to that struck by the known mould blade abutment. The second bars are shown at 12 and each is of the same length as the first bar, carrying the second 9 unit face and the 18 unit face, the pivot 8a of each second bar being .2" away from the pivot 8. The third bars are shown at 13 and carrying the third 9 unit face and the first 10 unit face, the pivot 8b of each third bar being spaced .2" from the second bar pivot 8a. The fourth bars are shown at 14 and carrying the 11, 12, 13, 14 and 15 unit faces, the pivot 8c of each fourth bar being spaced .2" from the third bar pivot 8b. One of the fourth bars is shown in Figure 6. It has a fulcrum pivot 15 which occupies the position 8c in Figure 3 and the position of the unit faces is indicated generally at 16. The second and third bars are of similar form to the fourth bar but with the unit faces suitably positioned thereon. The fulcrum pivot ends of the second, third and fourth bars are held in position by a spring plate 17. The cam faces of the bars (e. g. 11 in Figure 5) are held against the inclined surfaces 18 of a longitudinally slidable wedge 19 which bears against the inside surface of the back 6 and can be actuated by a control bar 20 slidable in a groove in the rack body and wedge back. This adjusting wedge 19 carries a pin 21 slidable in grooves 22 in the plates 5, and its faces 18 are stepped as shown. The double first bar 7, which holds the remaining bars as previously explained, may itself be held in position by a spring plate 23 shown in Figure 3.

Figures 7, 8, 9, 10, 11, 13:
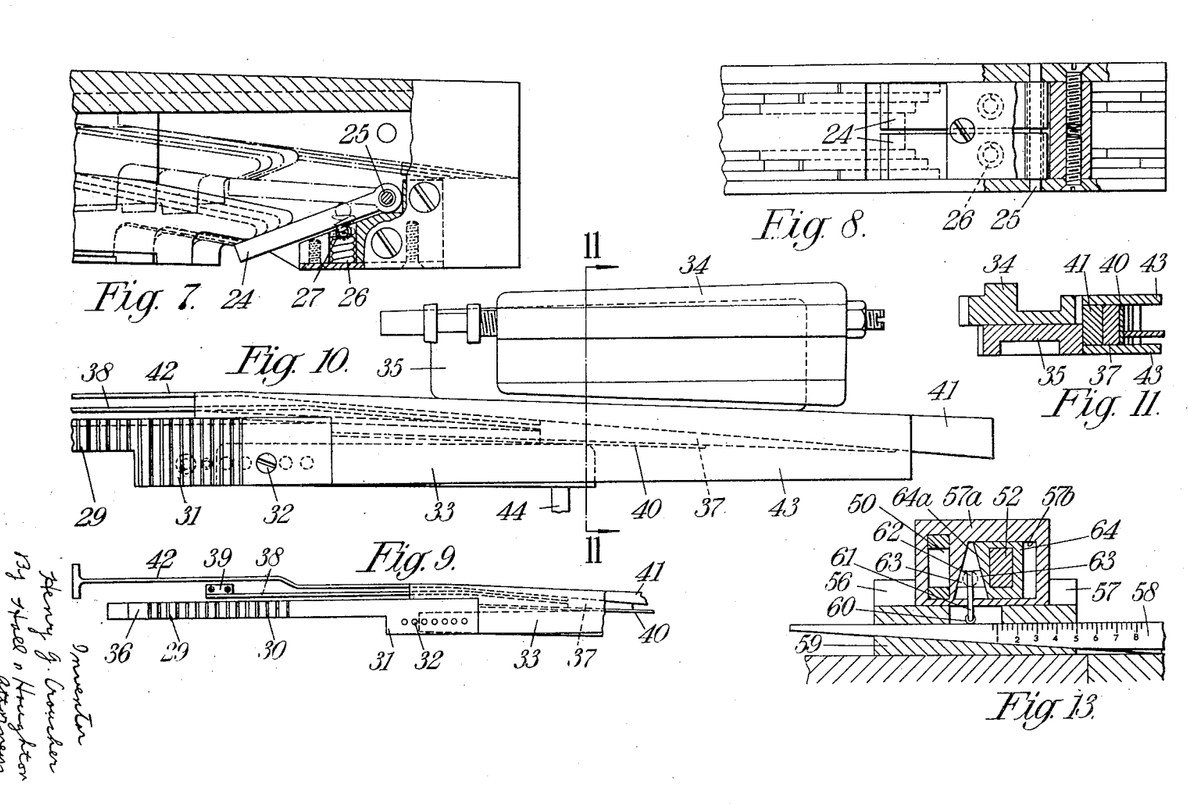
Figures 7 and 8 are an elevation and plan, partly in section, showing a modified means of retaining the blade ends in the device.
Figure 9 is an elevation, more or less diagrammatic, of a modified construction of control device according to the invention.
Figure 10 is an enlarged elevation showing part of the control device of Figure 9 in association with transfer wedges.
Figure 11 is a cross section on the line 11—11 of Figure 10.
Figure 13 is a cross section on the line 13—13 of Figure 12.

A modified arrangement for retaining the bar ends is shown in Figures 7 and 8. A pair of hinge plates 24 are loosely pivoted upon a pin 25 and loaded by springs 26 acting through balls 27. This arrangement allows for differences in the relative positioning of the blades for different set widths.

Displacement of the adjusting wedge 19 causes the cam faces of the bars to move in or out transversely of the wedge axis. Such possible movement is indicated by broken lines in Figure 7. If the movement of the adjusting wedge is such as to change the transverse dimension by .01383" at a point 3.6" from the pivot of the bar, then the travel at each of the .2" steps will be one additional unit. It will therefore be seen that the construction provides the unit arrangement of an existing and known normal wedge but is capable of increase or decrease in widths between the opposite wedge faces, i. e. it provides for variation in set sizes with the same unit arrangement. Whilst a single adjusting wedge is provided for adjusting the bars, this could be effected by a plurality of such means if so desired, providing that the individual bars receive identical movement. Also, whilst reference has been made to four bars for the particular unit arrangement in question, provision can readily be made for other bars to be fitted with different pivots to enable other unit arrangements to be obtained.

To prevent the possibility of the mould blade abutment fouling the unit faces of the wedge bars during displacement thereof, the adjusting wedge is provided with a suitable shallow groove which is engaged by a spring loaded guide plate associated with the known mould blade abutment, or a pivot bar can carry a suitable flange or grooving for such engagement. A groove for this purpose is shown at 28 in Figure 1.

In carrying the invention into effect according to another mode as illustrated in Figures 9, 10 and 11, applied by way of example to a transfer wedge arrangement of known kind in which the striking faces of the known transfer wedges are parallel with their abutment, the positioning rack 29 similar to the rack of a normal wedge and having teeth 30 is attached to or formed in one with a block 31 having pivots 32 for bars, one of which is shown at 33, which may be similar to the bars in the previously described example except that all the bars have pivot pins as shown instead of fulcrums engaged in recesses. The existing transfer wedges are shown at 34 and 35. A lug 36 on the rack 29 is adapted to be engaged by the matrix jaws of the existing machine. Interposed between the transfer wedge and the bars 33 is a floating wedge member 37 attached to a spring steel bar 38 which is connected to a block 39. Said wedge member has a facing surface against which the ends of the pivoted bars abut, such surface being parallel to the striking face of the transfer wedge. Preferably a rubbing plate 40 is inserted between the wedge member 37 and the bars to prevent wear on the latter. An adjusting wedge 41 is interposed between the floating wedge member 37 and the transfer wedges, and can be actuated by a control rod 42. Plates 43 serve as positioning guards for the pivot block 31, and the existing mould abutment is shown at 44. When automatic sizing is employed, the necessary controlling movements are applied to the control rod 42. When the control wedge 41 is displaced longitudinally it either effects or permits lateral displacement of the floating wedge member 37, and in this manner an increase or decrease occurs in the parallel width of the outer faces of the members 40 and 41, and the distance between the transfer wedges and the bars 33 is varied. When the rack 29, block 31, and bars 33 are displaced longitudinally by means of the lug 36 in the known manner to any desired position in relation to the mould abutment 44, the pivots 32 of the bars always remain in constant relationship with the transfer wedge 34, and only the bars 33 are affected by the relative movement of the members 37 and 41. In other words, the floating wedge 37 which has no longitudinal travel and the longitudinally displaceable member 41 are accommodated in the space between the pivot block plates 43 and only affect the bars 33. The desired adjustment of the adjusting wedge 41 can be effected in any convenient manner as will hereinafter appear. The arrangement can also be employed with manual control as well as with automatic control.

Figure 12:
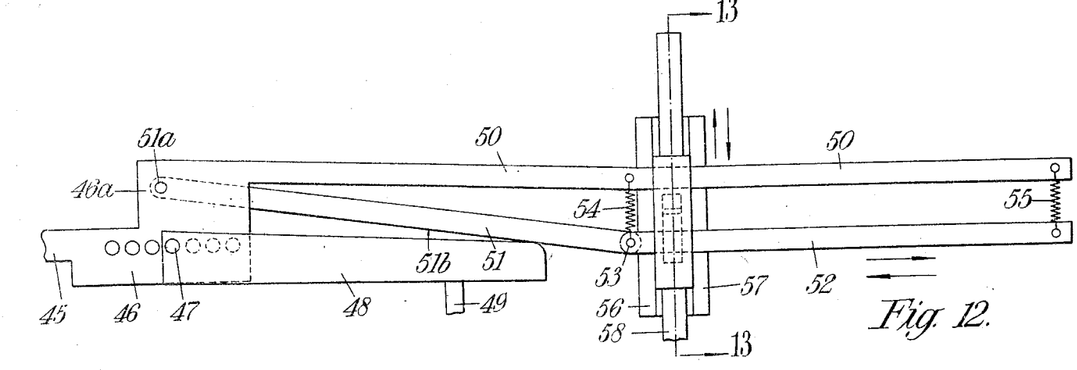
Figure 12 is an elevation showing part of another modified construction of a control device according to the invention.

In another mode of carrying the invention into effect, which can be employed with either manual or automatic setting, as illustrated in Figures 12 and 13, the adjusting wedge is disposed outside the main wedge structure and the required simultaneous adjustment of the bars is obtained by opening or closing a pair of pivoted members. A rack 45 similar to the normal rack of the known wedge device is attached to a pivot block 46 having pivots 47 for the bars 48 as described in the previous example, only one bar being illustrated in the figure. The other bars will be similar and mounted on the further pivots shown as will be readily understood from the previous examples. The block 46 is situated for sliding movement with the rack 45 relative to the known transfer wedge (not shown) of the existing machine. The known mould abutment is shown at 49. If a standard transfer wedge is employed, the block 46 will follow the angle thereof, but if the transfer wedge is modified, the block travel will be similarly modified. A flat bar or member 50 is attached to upward side extensions 46a of the pivot block 46 and is the same width as the usual upper and lower transfer wedges, being arranged so that it always lies closely against the transfer wedge in use. A second flat bar or member 51 is freely pivoted at 51a to the extensions 46a and bears on the bars 48 so as to control their position by its plane lower face 51b. A third flat bar or member 52 is pivoted at 53 to the bar or member 51 and is loaded by tension springs 54 and 55. It will be understood that the members 50, 51 and 52 travel longitudinally with the positioning rack 45 and the pivot block 46, but this does not affect the relative positions of 51 and 52. A housing 56, 57 is provided for an adjusting wedge 58 which is displaceable by any desired means along an inclined bed 59. The adjusting wedge 58 engages a roller 60 on an extension 61 of a ball head 62 which engages a pair of expanding blocks 63. Movement of the wedge 58 to the left as viewed in Figure 13 drives up the blocks 63 and moves the sliding carrier 64 to the right by engagement with its inclined face 64a, thereby separating the members 50 and 52. The adjusting wedge 58 is suitably graduated and can be clamped in adjusting position. The member 50 is slidable in a slot as shown in Figure 13 in a frame 57a forming part of the housing 56, 75 but has no lateral movement in said slot. The carrier 64 is slidable laterally in a slot 57b in the frame 57a. Thus by means of a longitudinal displacement of the adjusting wedge 58 the members 50 and 51 are caused to approach or separate, according to the direction of wedge displacement, and thereby the bars 48 of the control device are moved on their pivots as in the preceding example. Since the members 50 and 52 are parallel, longitudinal displacement of the control device as a whole by movement of the rack 45 from the known machine in the usual and well-known manner will not disturb the relative position of the bars 48 and the member 51.

Figure 14:
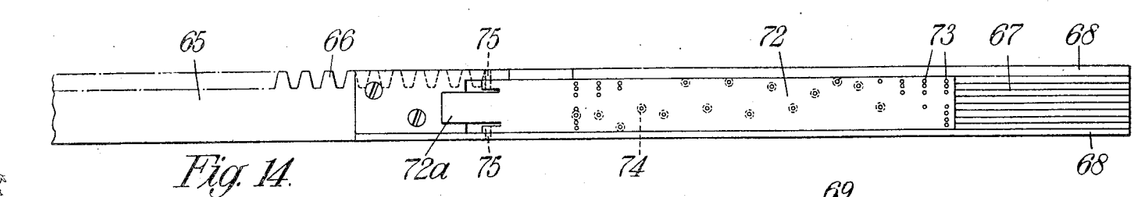
Figure 14 is an elevation of part of a modified control device according to the invention.
Figure 15:
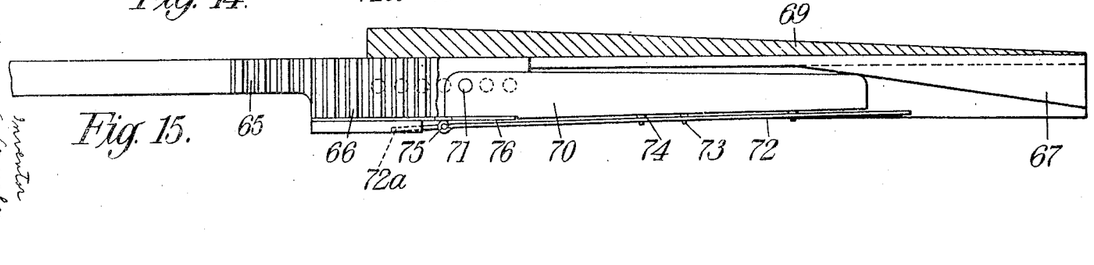
Figure 15 is a plan, partly in section, of the device of Figure 14.

An alternative arrangement of control device, intended to provide for variation of the unit arrangement, is illustrated in Figures 14 and 15. In this arrangement the bars are not formed with integral striking faces as previously described but are plain or parallel bars, and the striking faces are provided by separately insertible or adjustable elements. The usual rack body 65 is provided having rack teeth 66. The required number of bars are pivoted to the rack body and are controlled by a longitudinally slidable wedge 67 which is movable between guide plates 68 and bears against the wedge back 69. One of the bars is shown at 70 and is pivoted at 71. There may for example be seven bars and the pivots for these are shown in broken lines. A grid or perforated plate 72 is secured to the front of the seven parallel bars. The grid has seven rows of perforations 73 corresponding to the bars, and each row comprises a suitable number, say 18, of perforations spaced .2″ apart. A number of headed studs 74 are provided which can be inserted in the holes so that their heads rest against the respective bars and their shanks project beyond the grid or plate to form the striking faces for the known mould abutment. The grid 72 is pivoted at 75 so that it can follow up the bars 70 and is held in position by an extension piece 72a. A spring 76 maintains the bars against their wedges. The three studs indicated in the upper row in Figure 14 are all related to the pivot 71 and bar 70 and all have the same datum line from the said pivot. Each bar has its own engageable surface on the wedge 67 so that this relation is maintained. With this arrangement, a stud can be placed anywhere in the grid, and according to the bar upon which it rests and the relative distance from the bar pivot, so any desired multiple of the unit measurement can be obtained. Thus the unit arrangement can be varied as desired, and since the bars are all of equal length, the unit size can be varied while retaining the selected unit arrangement by appropriate displacements of the adjusting wedge 67.

Figures 16, 17:
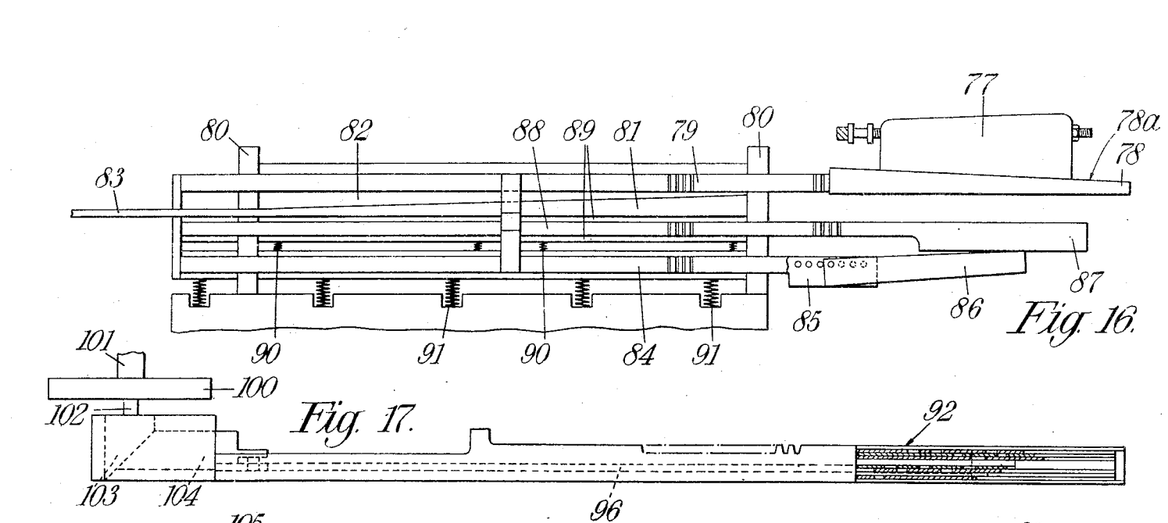
Figure 16 is a plan view, more or less diagrammatic, of another modified arrangement of control device according to the invention.
Figure 17 is an elevation of a control device according to the invention showing one possible mode of actuating the adjusting wedge.

Another possible variant of control device according to the invention is shown in Figure 16. The known transfer wedge of the existing machine is shown at 77, and a wedge 78 is provided which has a surface 78a similar to that of the existing and known normal wedge and also has a rack 79 integral therewith slidable longitudinally in a groove in a bed 80. An adjusting wedge 81 is displaceable longitudinally against an inclined surface 82 on the bed 80 and can be displaced either manually or mechanically by any convenient means which can be coupled to a control rod 83 attached to the wedge to vary the set size as required. A positioning rack 84 is provided which is slidable longitudinally in the bed 80 and carries a pivot block 85 and a series of bars 86 (only one of which is shown) which are arranged in a similar manner to the bars shown in Figures 9 and 10. These bars 86 bear against an adjustable member 87 which is connected to and actuated by a rack 88 which is slidable in a channel member having side walls 89. The said channel member is displaceable laterally in the bed 80 and is loaded by springs 90, its lateral position being determined by the position of the adjusting wedge 81, against which the aforesaid channel member is pressed by the springs 90. With this arrangement the desired variation in set size, i. e. involving adjustment of the bars 86 as described in the previous examples, is accomplished by lateral movement of the member 87 as determined by the adjusting wedge 81. For the adjustment of the control device as a whole in the same manner as with the existing and known normal wedge, the racks 79, 88 and 84 are displaced simultaneously by the known means so that there is no relative movement between the parts 78, 86 and 87. During such adjustment, these parts act in the same manner as the existing normal wedge. The bed 80 can be held against suitable stop means (not shown) by loading springs 91.

Figure 18:
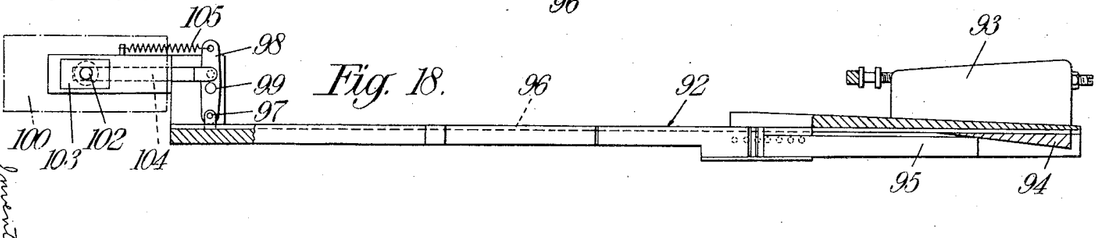
Figure 18 is a plan view of the arrangement of Figure 17.

An arrangement for actuating the adjusting wedge in a control wedge device such as is described for example in connection with Figure 1 is illustrated in Figures 17 and 18. The control wedge device is shown generally at 92 and the known transfer wedge arrangement is indicated at 93, the adjusting wedge 94 for the bars (one of which is shown at 95) being actuated by a sliding rod 96 which is pivotally connected at 97 to a lever 98 pivoted at 99. A control plate 100 on a bar 101 is given a downward travel in accordance with an automatic sizing control mechanism to be described later. Beneath the plate 100 is a stud 102 attached to a wedge 103 which co-operates with a member 104 connected to lever 98 which is loaded by a spring 105. It will be understood that the control device 92 is arranged in the known machine in the same manner as the existing normal wedge and has appropriate adjusting movements imparted to it by the known means. Such adjusting movements will not in any way affect the positioning of the bars 95 in the device since the stud 102 will merely slide across the under surface of the plate 100 and no downward motion will be imparted to it. When it is desired to vary the set size in accordance with the present invention, the plate 100 and the bar 101 are displaced by any convenient adjusting means and thereby the adjusting wedge 94 is displaced to vary the positions of the bars 95 as required.

Figure 19:
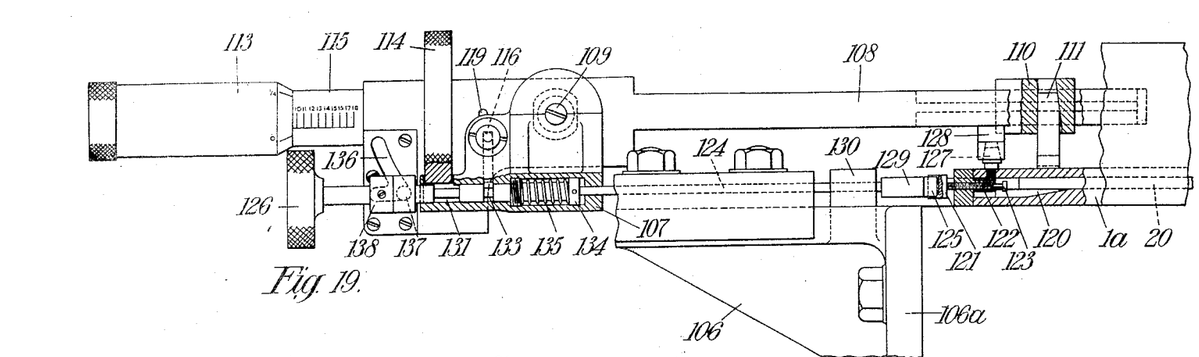
Figure 19 is an elevation of an adjusting mechanism for a control device according to the invention.
Figures 20, 21:
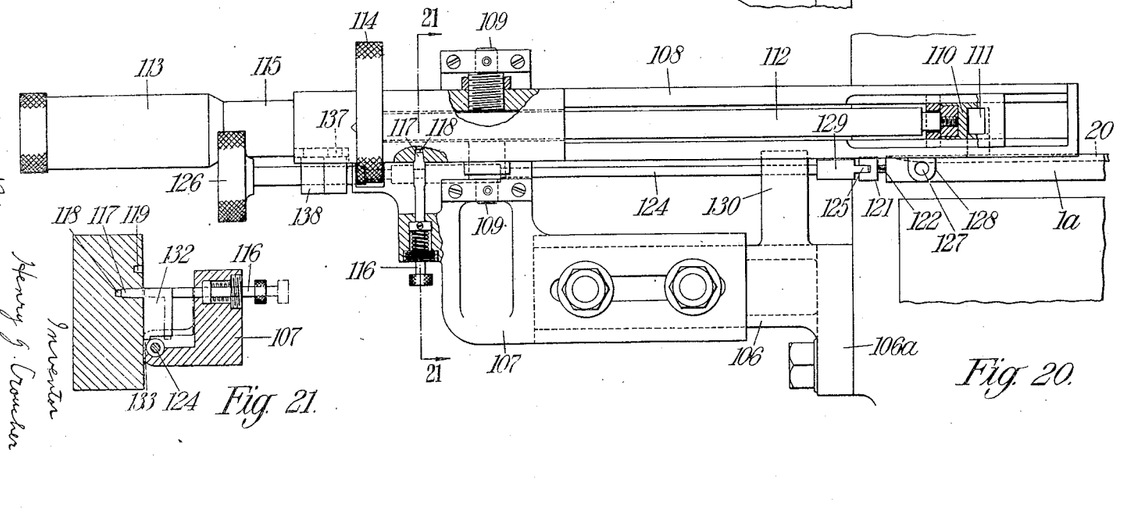
Figure 20 is a plan view of the above adjusting mechanism.
Figure 21 is a section taken on the line 21—21 of Figure 20.

A suitable manually operable means for displacing the adjusting wedge within the main wedge body of a control device as shown in Figure 1 is illustrated in Figures 19, 20 and 21, and is also shown in perspective in Figure 1. A bracket 106 attached to the existing machine frame 106a carries an adjustable extension 107 upon which a frame 108 is tiltably carried upon pivots 109. A head 110 slidable in the frame 108 engages a lug 111 on the adjusting wedge control bar 20, and is connected by a rod 112 to a setting micrometer head 113 having a locking ring 114. The barrel 115 of the micrometer is marked to show the set sizes as indicated. A spring loaded pin 116 has a tapered end 117 which can enter a hole 118 in the frame 108 to secure the latter in the position in which it is shown in Figures 19 and 20. The frame can be tilted about its pivots to disengage the head 110 from the lug 111, after withdrawing the pin 116, and can be held in tilted and disengaged position by engagement of the pin in a second hole 119 in the frame as shown in Figure 21.

A clamping wedge 120 is adapted to drive the wedge control bar 20 against the body of the wedge rack extension 1a when the slotted head 121 of a screw 122 is rotated. The screw has a head 123 for withdrawing the wedge 120 for unclamping. A shaft 124 is provided with a tongue 125 fitting the slot in head 121 and at its opposite end carries a knurled head 126 by which the shaft may be rotated for clamping and unclamping the control bar 20 by means of the screw 122. The rack extension 1a carries a tapered locating pin 127 which is engaged by a tapered recess in a member 128 attached to the frame 108. When unclamping, the shaft 124 can be rotated until its shoulder 129 abuts the bracket 130. In this position a groove 131 on the shaft 124 is brought into alignment with the locking ring 114 of the micrometer. The arrangement is such that until this alignment is reached the locking ring cannot be unclamped, and until the screw 122 is in clamping position the locking ring cannot be clamped. The pin 116 carries a depending member 132 (see Figure 21) which can pass across a groove 133 in the shaft 124 when the shoulder 129 is bearing against the bracket 130, i. e. when the shaft is in unclamping position. Thus the micrometer locking ring and the clamping screw cannot be unlocked until the pin 116 is engaged in the frame 108, nor can the pin be withdrawn until the former are locked. Means are also provided to ensure that the tongue 125 of shaft 124 can correctly engage the slotted head of clamping screw 122. For this purpose a collar 134 is fixed to the shaft and loaded by a spring 135. A cam slot 136 on the frame 108 is engaged by a stud 137 on the shaft 124. As the frame is raised by tilting about its pivots the stud is forced to the left as viewed in Figure 19 and engages a collar 138 on the shaft to displace the latter to the left and withdraw the tongue 125. When the frame is returned, the shaft is pressed to the right by the spring 135 and the tongue 125 will engage the slot in the head 121 as soon as the shaft is rotated.

It will be understood that when the control device is operating in the normal manner in the existing machine, the control rod 20 is locked by the wedge 120, the tongue 125 is withdrawn from the screw head 121, and the pivoted frame 108 is held in raised position with the pin 116 engaged in the hole 119 in the frame. The control device is therefore free to perform its normal longitudinal adjusting movements in the existing machine as is well understood. When it is desired to vary the set size in accordance with the present invention, the frame 108 is lowered and the recess in the member 128 is engaged over the tapered head 127 on the rack extension 1a. Thus the control device as a whole is held rigidly so that it cannot receive any longitudinal displacement. When lowering the frame 108, the hollow in the head 110 is also caused to engage the upper end of the lug 111 which forms part of or is attached to the control bar 20 of the adjusting wedge. The lowering of the frame 108 also causes the rod 124 to move to the right under spring pressure so that the tongue 125 engages the screw head 121 as previously described. The knurled head 126 is then rotated so that the said tongue engages the screw head slot and the clamping wedge 120 is withdrawn to free the control bar 20. The micrometer head 113 can then be rotated, after releasing the locking ring 114, so as to adjust the control bar 20 to the new set size desired. The micrometer is then locked, the wedge 120 is displaced by the knurled head 126 to clamp the control rod 20 in adjusted position, and the frame 108 is raised, thereby releasing the control device as a whole for a further series of operations with the new set size adjustment.

Figure 22:
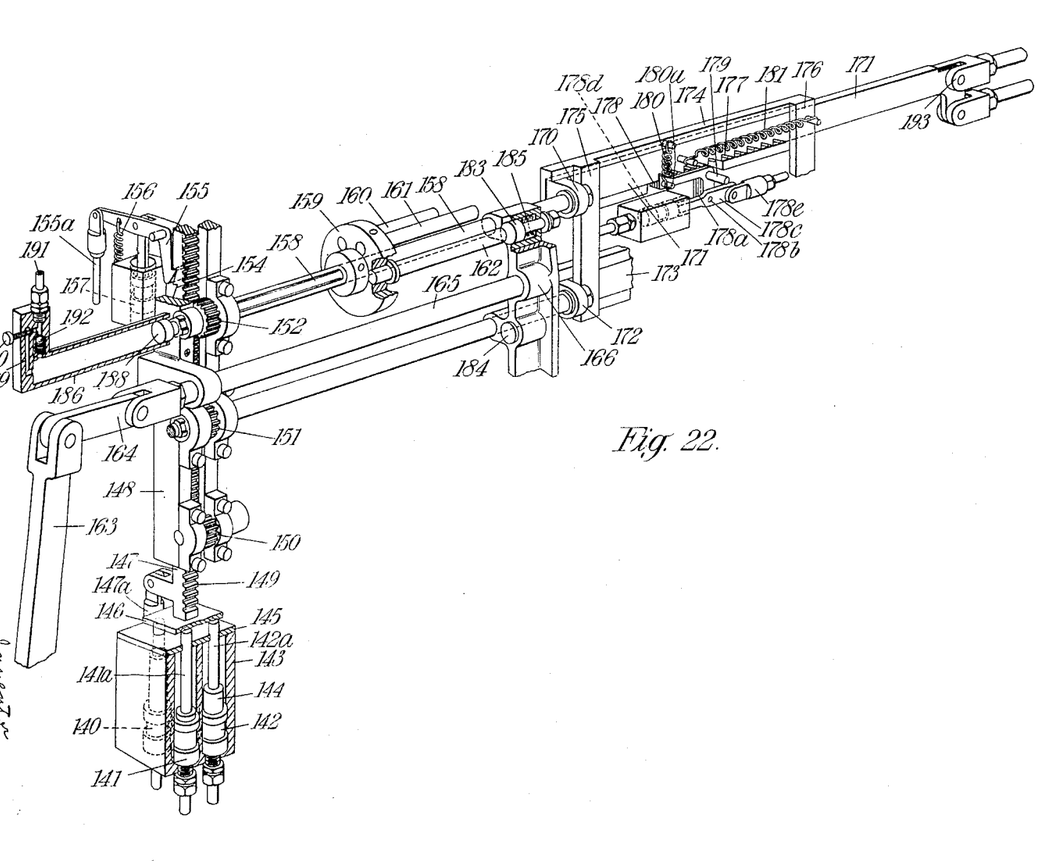
Figure 22 is a perspective view of the mechanism employed for automatic setting of a control device according to the invention.

Instead of adjusting the improved control wedge device by manual means in order to obtain the desired variations in set sizes as previously described, means may be provided for effecting such adjustment mechanically or automatically and a mechanism for this purpose is shown in Figure 22. It will be understood that the arrangement may be employed in conjunction with a type casting machine known under the registered trade-mark Monotype or of the kind described in British patent specification No. 8,633 of 1899 for determining the width of the cast type, or in conjunction with apparatus as described in the specification of British patent application No. 6,848 of 1949 (U. S. application Ser. No. 145,132, filed March 7, 1950, patented March 19, 1953, No. 2,639,067) for controlling the spacing of the reproduced characters, such characters being produced by any desired means, including photographic means. A series of pistons 140, 141 and 142 actuated by compressed air are accommodated in a housing 143 which also includes a fourth piston of a similar kind (not shown). These pistons each have an extension sleeve such as the sleeve 144 on the piston 142 which sleeves will strike the top plate 145 of the housing 143 when the pistons are raised by admission of compressed air to their cylinders. The sleeves are of different lengths so that each piston will rise to a different height when actuated. It will be understood that the supply of compressed air to the individual pistons can be controlled by a key actuated valve on a keyboard such as is described in the specification of British patent application No. 13,962 of 1950 (U. S. application Ser. No. 229,341, filed June 1, 1951), or by suitable controlling record strip perforations in a mechanism as described in the specification of British patent application No. 13,961 of 1950 (U. S. application Ser. No. 229,342, filed June 1, 1951), or by suitable controlling record strip perforations from a keyboard mechanism as described in British patent specification No. 17,199 of 1908. Thus in the broader sense, the present invention contemplates means for effecting the adjustments under control, i. e. either direct or indirect control, of a mechanism of the keyboard type. The piston rods, such as 141a, 142a, project through the top plate 145 and are arranged so that when the pistons are raised the rods lift a base plate 146 attached to a rack 147 which is slidable vertically in guides 148. The front face of the rack 147 is formed with teeth 149 which mesh with gear wheels 150, 151 and 152 which are held in bearings which prevent endwise movement of the gear wheels. The rear face of the rack 147 is formed with teeth 154 which are engaged by a detent 155 for retaining the rack in any position to which it has been lifted. The detent 155 is loaded by a spring 156 and can be released by an upward thrust applied to a link 155a, thereby causing the rack to return by gravity to its initial position. Such release can also be effected by piston 157 in a cylinder arranged to be actuated by compressed air. Any other suitable means for actuating the detent may be employed. The gear wheel 152 is splined to a shaft 158 to permit longitudinal sliding movement of the said shaft. The shaft 158 has secured to it a disc 159 carrying four gauge rods, three of which are shown at 160, 161 and 162. These gauge rods are dimensioned according to the type width system employed to provide any desired positioning of the adjusting wedge of a wedge control device according to the present invention as previously described. A lever 163 is actuated by a cam or other suitable means on the main shaft of the known or existing machine and is attached by means of a link 164 and a rod 165 to a crosshead 166 which is freely slidable on the shaft 158 and also on a shaft 167, the latter being slidably splined to the gear wheel 151. The shaft 167 and the gear wheels 150 and 151 are not concerned with the present invention. The shaft 158 is connected to a lug 170 on a slidable rack 171 in a manner permitting the shaft to rotate freely in the lug but affording an endwise connection therewith. The shaft 167 is similarly connected to a lug 172 on a slidable rack 173, but the latter is not concerned with the present invention. The racks 171 and 173 are mounted for longitudinal sliding motion in guides in a frame 174 and are retained in position by cross members 175 and 176. The rack 171 is preferably of composite form comprising four similar rack elements having teeth 177 and secured together side by side with their teeth in longitudinally staggered relation as indicated. These rack elements can be engaged by any one of four pawls indicated at 178, the pawls being carried independently upon a pivot pin 179 and loaded by a spring 180 attached to a pin 180a which extends through all the pawls. The slidable rack 171 is loaded by a spring 181. The provision of a plurality of rack elements and pawls as described enables a fine adjustment of the rack setting to be obtained to afford quarter set sizes in the setting of the adjusting rack of the control wedge device. This expedient affords the same results as a single rack member having correspondingly fine teeth. The cross-head 166 carries buffers 183 and 184. The buffer 183 is loaded by a spring 185 and the arrangement is such that movement of the cross-head to the left as viewed in Figure 22 will bring the buffer into engagement with the end of one or other of the gauge rods carried by the disc 159, according to the position occupied by the said disc as determined by the piston operated rack 147. To prevent the possibility of the rack 171 over-running the pawls 178, the shaft 158 is provided with a hydraulic damping device comprising a cylinder 186. A piston 188 secured to the end of the shaft 158 is slidable in the cylinder 186 and is adapted, as the shaft is displaced, to force oil out of the cylinder through a bleed passage 189 controlled by a needle valve 190 and through a pipe 191 to an oil reservoir (not shown). On the reverse movement of the shaft 158, the oil returns to the cylinder by way of a spring-loaded ball valve 192. The rack 171 extends beyond the frame 184 and has on its end a head 193 which can be connected to the adjusting wedge of the control wedge device as previously described. Thus for example the head 193 can be coupled in any convenient manner to the control bar 20 of Figure 2, the control bar 42 of Figure 10, the wedge 58 of Figure 12, the control bar 83 of Figure 16, or the control bar 101 of Figure 17.

It will be seen that according to which of the pistons such as 140, 141, 142 is actuated by supplying compressed air to its cylinder, the vertical rack 147 is raised by a predetermined amount and the shaft 158 is rotated to set one or other of the gauge rods 160, 161, 162 into a position to be engaged by the spring buffer 183. The crosshead 166 has periodically imparted to it a constant travel to the left as viewed in the figure by the lever 163 and rod 165, and engagement of the selected gauge rod by the buffer 183 causes a sliding motion of the shaft 158, and hence of the rack 171 which is connected to it, by an amount determined by the dimensioned length of the gauge rod, and therefore the adjusting wedge coupled to the head 193 is moved by the same amount. The rack 171 can be returned to its initial position ready for a new setting by its spring 181 upon release of the pawls 178, which can be effected by any convenient means. Thus the pawls 178 may have downwardly directed arms 178a engaged upon a pin 178b on a link 178c connected to an air operable piston 178d. Release may be effected by actuation of the said piston under the control of a key on a keyboard. Thus the supply of compressed air to the piston 178d can be controlled by a key actuated valve on a keyboard such as is described in the specification of British patent application No. 13,962 of 1950, or by suitable controlling record strip perforations in a mechanism as described in the specification of British patent application No. 13,961 of 1950, or by suitable controlling record strip perforations from a keyboard mechanism as described in British patent specification No. 17,199 of 1908 for example.

Instead of actuating the vertical rack 147 by compressed air pistons, this can be effected mechanically by means of a rod 147a which is raised by mechanical linkage from a rod in the make-up machine using the caster method as described in British patent application No. 13,961 of 1950 (U. S. application Ser. No. 229,342, filed June 1, 1951). Release of the rack 171 can also be effected mechanically by means of a link 178e connected for actuation by the stop wheel mechanism as described in the British patent application referred to above.

It will be appreciated that in applying the adjusting mechanism of Figure 22 to a control wedge device as shown in Figures 9 and 10, the head 193 is connected to the control bar 42, and when employing adjustable bars 33 having the characteristics previously described, a movement of .3" of the control bar 42 produces a sufficient variation of the bars 33, in relation to the known mould blade abutment, to alter the type width by one set, i. e. by .01383". Similarly a movement of .075" of the head 193 effects a variation of a quarter set. As is well known, type widths may be any combination of sets and quarter sets. The factors which govern the travel of the head 193 are (a) the length of the stops or gauge rods 160, 161, 162, and (b) the dimensioning of the rack 171 to correspond with the stops so that it can be latched to position the adjusting wedge of the control wedge device correctly. The rods may be conveniently marked 7, 9¾ and 11¼ to correspond with the desired sizes. Also, in the example being considered, the rack 171 can be marked "Point" to indicate that the rack teeth are based on the twelve set of .166" dimension. For other systems the rack could be marked "English" and based on a twelve set of .1667", or it could be marked "Didot" and based on .1776" for twelve set. Other type width bases could obviously be employed.

Preferably the rack 171, or at least a section thereof carrying the rack teeth 177, is constructed so as to be removable and replaceable by a rack the teeth of which are dimensioned for another type dimension system. Also as described above, the toothed rack part comprises four rack elements secured together side by side with their teeth in staggered relation. The teeth of each rack element are at one set distances and the elements are staggered by quarter set distances. In this way an adjustment to the fineness of a quarter set is obtained without the use of excessively fine teeth. The operation of the lever 163 as previously described therefore causes a travel of the disc 159 carrying the gauge rods through a predetermined distance based on sets of desired length, for example 4 to 18 in quarter set steps, of any required type body width system. Since the disc 159 is connected to the rack 171 and thence to the head 193 which is itself coupled to the adjusting wedge control bar 42 referred to previously, the same travel is obtained in the adjusting wedge 41 (Figures 9 and 10) and this is held or locked in the desired adjusted position by means of the pawls 178 until released. Thus it will be seen that the disc 159 carrying the stop means or gauge rods constitutes an adjustable positioning or stop means whereby an actuated lever or equivalent means can produce a travel of desired and predetermined length to effect accurate adjustment of the control wedge device, the said positioning or stop means being adjustable either by pneumatic or mechanical means. Automatic control of character width or sizing is obtained when employing this mechanism in conjunction with make-up apparatus and/or keyboard controlled mechanisms as referred to previously. It may be pointed out that the mechanism shown in Figure 22 may form part of the "Panel A" mechanism described in the specification of British patent application No. 13,961 of 1950 (U. S. application Ser. No. 229,342, filed June 1, 1951) to which reference may be made. Thus this mechanism may be employed for mechanically or automatically adjusting a control wedge device according to the present invention for different set size adjustments.

It is to be understood that the invention is not restricted to any particular point system of type measurement. In the examples previously described the adjusting wedge or its equivalent means provides desired variation in the inclination of the oscillatably mounted means or bars, but if required such adjusting wedge can itself be made adjustable for different type measurement systems. Thus for example the relative inclination of the faces of the adjusting wedge and of the floating wedge member previously described can be made adjustable in any suitable manner, for example by the use of adjustable eccentrics. Also the invention can be applied to any number of die case rows or their equivalent and any unit arrangement as previously described.

When applied to a single type casting and composing machine such as that known under the registered trade-mark Monotype or of the kind described in British patent specification No. 8,633 of 1899, the need for providing a large number of normal wedge devices is eliminated. The same advantage is obtained when the invention is applied in conjunction with an apparatus for reproducing typographical matter as described in the specification of British patent application No. 6,848 of 1949 (U. S. application Ser. No. 145,132, filed March 7, 1950, patented March 19, 1953, No. 2,639,067). Further advantages in time saving are obtained when the invention is applied to either of the above machines or apparatus in conjunction with apparatus for enabling pages of typographical matter to be made up as described in British patent application No. 13,961 of 1950, or in conjunction with keyboard controlled mechanisms, particularly such as described in British patent application No. 13,962 of 1950 (U. S. application Ser. No. 229,341, filed June 1, 1951), which produce perforated record bearing means or paper strip for controlling typographical composing machines or for producing typographical matter as referred to previously.

Thus by this invention there is provided a means for controlling the width or spacing of type, type faced impressions or otherwise reproduced characters which means is variable and capable of adjustment for different set widths and for different unit arrangements, and the set width adjustment can be effected either by manual or by mechanical control as may be desired, whereby the hitherto present necessity of exchanging the controlling wedge means when changing to a different character size is eliminated. Control wedge means according to the invention can be employed in conjunction with a die case or equivalent means containing rows of members capable of reproducing characters, the rows being arranged in any desired manner and the character widths of the different rows being arranged progressively or otherwise as desired. The invention is not restricted to the examples described, since the details of the mechanisms employed to perform the essential functions may be widely varied.

I claim:

1. In or for apparatus for reproducing typographical matter by successive character forming operations and comprising a periodically movable member the travel of which determines the width and spacing of the characters in the line of typographical matter, a displaceable control wedge device for interposition in the path of such periodically movable member to limit the periodic travel thereof to variable amounts and comprising a body, a plurality of elements arranged for pivotal movement in the body and each formed to determine the position of a limit controlling face with said faces constituting a unit like series, and means for controllably varying the inclinations of said elements with respect to a datum for obtaining desired variation in set sizes in the reproduction of lines of typographical matter.

2. A control wedge device according to claim 1, in which the elements comprise bars of equal length having their fulcrum points for pivotal movement spaced apart along a line.

3. A control wedge device according to claim 1, in which the limit controlling faces as determined by the series of elements correspond to matrix or die case rows, and the said faces are distributed among a suitable number of elements according to the unit arrangement employed.

4. A control wedge device according to claim 1, comprising members affording limit controlling faces engaging the elements, said members being variably disposable with respect thereto whereby different unit arrangements are obtainable.

5. A control wedge device according to claim 1, in which the elements comprise bars having their fulcrum points for pivotal movement spaced apart, stud members engageable with said bars for affording limit controlling faces and means enabling said stud members to be variably positioned along the bars, whereby the adjustment of said stud members affords different unit arrangements of the limit controlling faces.

6. A control wedge device according to claim 1, in which the elements comprise bars having their fulcrum points for pivotal movement spaced apart, stud members engageable with said bars for affording limit controlling faces, and perforated plate means located adjacent the bars and having rows of spaced perforations corresponding to the bars and adapted to receive the stud members, whereby said stud members can be varied in relation to the bars to afford different unit arrangements of the limit controlling faces.

7. A control wedge device according to claim 1, in which the means for controllably varying the inclinations of the elements comprises an adjusting wedge device mounted for longitudinal displacement.

8. A control wedge device according to claim 1, in which the means for controllably varying the inclinations of the elements comprises an adjusting wedge slidable in the body and engaging the said elements.

9. A control wedge device according to claim 1, in which the body has a rack portion whereby displacements are imparted thereto, said body and rack portion having a groove, a control bar being slidable in said groove, and an adjusting wedge connected to said control bar engages the elements for varying the inclinations thereof.

10. A control wedge device according to claim 1, in which the elements comprise bars having their fulcrums for pivotal movement spaced apart along a line, and the bars comprise a central bar and duplicate bars symmetrically arranged on either side of said central bar.

11. A control wedge device according to claim 1, in which the elements are bars having their fulcrums for pivotal movement spaced apart along a line, and comprising a central bar and duplicate bars symmetrically arranged on either side of the central bar, laterally projecting faces at the end of the central bar remote from the fulcrum pivot thereof which receive and support the remaining bars, and a spring mounted on the body for supporting the central bar.

12. A control wedge device according to claim 1, in which the elements comprise bars having their fulcrums for pivotal movement spaced apart along a line, and spring loaded and pivotally mounted plates on the body for supporting the ends of the bars remote from their fulcrum pivots.

13. A control wedge device according to claim 1, comprising a pivot block integral with a rack member, bars constituting the pivotal elements and affording the control wedge faces pivoted to the block at predetermined spaced points, a floating wedge member engageable with the bars and movable with the rack member, and an adjusting wedge member engaged with the floating wedge member and adapted to be engaged at its opposite face with a transfer wedge, said adjusting wedge being adapted to be longitudinally displaced by control means relative to the bars and floating wedge member whereby the desired variation in set sizes is obtained.

14. A control wedge device according to claim 1, in which the means for controllably varying the inclinations of the elements comprises an adjusting wedge located outside the body of the device.

15. A control wedge device according to claim 1, comprising a pivot block integral with a longitudinally displaceable rack member, control bars constituting the elements and having control faces, said bars being pivoted to the block at predetermined spaced points, a bar integral with the pivot block and parallel with the rack member, a second bar pivoted to said block and inclined with respect to said first bar to engage the control bars, a third bar pivoted to the end of the second bar and parallel to the first bar, and wedge means for varying the distance between the first and third bars to vary the inclination of the second bar and thereby effect the required set size adjustment of the wedge control bars.

16. A control wedge device according to claim 1, comprising a pivot block integral with a longitudinally displaceable rack member, control bars constituting the elements and having control faces, said bars being pivoted to the block at predetermined spaced points, a bar integral with the pivot block and parallel with the rack member, a second bar pivoted to said block and inclined with respect to said first bar to engage the control bars, a third bar pivoted to the end of the second bar and parallel to the first bar, a carrier in which said first and third bars are slidable in accordance with movements of the rack member, an aperture block in which said third bar is slidable, said apertured block being slidable in the carrier towards and away from the first bar and having an inclined face, an expanding block engaging said inclined face, loading spring means connecting the first and third bars, and an adjusting wedge disposed transversely with respect to said first and third bars for sliding the apertured block to vary the distance between the said bars.

17. A control wedge device according to claim 1, comprising a bed having guides therein for a longitudinally displaceable rack member carrying a wedge member adapted for engagement with a transfer wedge, an adjusting wedge displaceable longitudinally against an inclined surface in said bed, control means for displacing said adjusting wedge, a channel member displaceable laterally in said bed and held against said adjusting wedge by spring means whereby displacement of the adjusting wedge effects lateral adjustment of said channel member, a second rack member slidable longitudinally in said channel member, a third rack member slidable longitudinally in said bed and carrying a pivot block, control bars constituting the pivotally movable elements pivoted at predetermined spaced points to said block and affording limit control faces, and a member carried by said second rack member and engageable by said control bars, whereby the first, second and third rack members are adapted to be displaced longitudinally in unison by normal wedge displacing means, and adjustment for varying set sizes is effected by displacement of the said adjusting wedge to effect lateral movement of the second rack member and thereby vary the inclinations of the control bars.

18. A control wedge device according to claim 1, in which the elements are inclinable bars actuatable by an adjusting wedge slidable in the body of the device, and comprising a spring loaded pivoted lever connecting the said adjusting wedge to a wedge block, a second wedge block movable at right angles to the first wedge block for actuating the latter, and a plate having a plane surface engaging said second wedge block and movable in a direction at right angles to its surface for displacing said second wedge block and thereby adjusting the control wedge device, the plane surface of said plate being disposed parallel to the normal travel of the control wedge device, whereby such normal travel does not affect the adjusting wedge of said device.

19. A control wedge device according to claim 1, in which the inclinations of the pivotally movable elements are varied by an adjusting wedge means and comprising a slidable actuating bar connected to said adjustable wedge means, micrometer adjusting means on a displaceable frame, and a disengageable connection between said micrometer means and said actuating bar, said connection being engageable and disengageable by displacing the frame.

20. A control wedge device according to claim 1, in which the inclinations of the pivotally movable elements are varied by an adjusting wedge means, and comprising a slidable actuating bar connected to said adjustable wedge means, micrometer adjusting means on a tiltably mounted frame, a disengageable connection between said micrometer means and said actuating bar, and spring loaded locking means for holding the frame in both engaged and disengaged positions of the micrometer adjusting means.

21. A control wedge device according to claim 1, in which the inclinations of the pivotally movable elements are varied by an adjusting wedge means, and comprising a slidable actuating bar connected to said adjustable wedge means, means operable to clamp and unclamp said actuating bar, micrometer adjusting means on a displaceable frame, and a disengageable connection between said micrometer means and said actuating bar, said connection being engageable and disengageable by displacing the frame.

22. A control wedge device according to claim 1, in which the inclinations of the pivotally movable elements are varied by an adjusting wedge means, and comprising a slidable actuating bar connected to said adjustable wedge means, micrometer adjusting means on a displaceable frame, a disengageable connection between said micrometer means and said actuating bar, and means on the frame for engaging the body of the control wedge device to prevent movement thereof during adjustment of the actuating bar.

23. A control wedge device according to claim 1, in which the inclinations of the pivotally movable elements are varied by an adjusting wedge means, and comprising a slidable actuating bar connected to said adjustable wedge means, means operable to clamp and unclamp said actuating bar, micrometer adjusting means on a displaceable frame, a disengageable connection between said micrometer means and said actuating bar, spring loaded locking means for holding the frame in both engaged and disengaged positions of the micrometer adjusting means, a locking ring for the micrometer adjusting means, and an interlocking connection between the locking ring, the clamping means for the actuating bar, and the spring loaded locking means for the displaceable frame whereby the micrometer and clamping means cannot be released until the frame is in operative adjusting position with its locking means engaged and the said locking means cannot be released until the locking ring is locked and the actuating bar is clamped.

24. A control wedge device according to claim 1, comprising means for mechanically effecting adjustment of the pivotally movable elements under the control of a mechanism of the keyboard type.

25. A control wedge device according to claim 1, in which the inclinations of the elements are varied by an adjusting wedge means, in combination with adjusting mechanism comprising a slidable member operatively connected to said adjusting wedge means, means for imparting movement to said slidable member, adjustable stop means for determining the travel of said slidable member and thereby the adjusted set size of the control wedge device, and means for locking said slidable member in adjusted position.

26. A control wedge device according to claim 1, in which the inclinations of the elements are varied by an adjusting wedge means, in combination with adjusting mechanism comprising a slidable toothed rack operatively connected to said adjusting wedge means, means for imparting movement to said slidable rack, adjustable stop means for determining the travel of the rack and thereby the adjusted set size of the control wedge device, and detent means for locking the rack in adjusted position.

27. A control wedge device according to claim 1, in which the inclinations of the elements are varied by an adjusting wedge means, in combination with adjusting mechanism comprising a slidable toothed rack operatively connected to said adjusting wedge means, means for imparting movement to said slidable rack, adjustable stop means for determining the travel of the rack and thereby the adjusted set size of the control wedge device, detent means for locking the rack in adjusted position, means for releasing said detent means, and spring means for returning the rack to an initial position.

28. A control wedge device according to claim 1, in which the inclinations of the elements are varied by an adjusting wedge means, in combination with adjusting mechanism comprising a slidable member operatively connected to said adjusting wedge means, means for imparting movement to said slidable member, adjustable stop means for determining the travel of said slidable member and thereby the adjusted set size of the control wedge device, compressed air actuated pistons adapted to be controlled from a mechanism of the keyboard type for adjusting said stop means, and means for locking said slidable member in adjusted position.

29. A control wedge device according to claim 1, in which the inclinations of the elements are varied by an adjusting wedge means, in combination with adjusting mechanism comprising a slidable member operatively connected to said adjusting wedge means, means for imparting movement to said slidable member, adjustable stop means for determining the travel of said slidable member and thereby the adjusted set size of the control wedge device, said stop means comprising stop members of different length carried on a rotatable shaft, a rack and pinion for rotating said shaft, compressed air pistons controllable from a mechanism of the keyboard type for actuating said rack selectively to bring the desired stop member into operative stopping position, and means for locking the slidable member in adjusted position.

30. A control wedge device according to claim 1, in which the elements comprise elongated members having their pivotal points arranged in a line and equally spaced, and the adjusting means for varying the inclinations of said members engages said members at points on the members equally spaced from their pivotal points, said adjusting means being shaped so that the inclinations of the members are uniformly varied at each adjustment.

31. A control wedge device according to claim 1, in which the elements comprise elongated members having their pivotal points spaced apart, and the adjusting means for varying the inclinations of said members is of wedge like form engaging the members at points remote from their pivotal points so that successive increases in inclination of the members by displacement of the adjusting means are progressively reduced and the adjusted displacements of the controlling faces of the members in a direction transverse to the datum comprise uniform increments.

HENRY GEORGE CROUCHER.

No references cited.